F. CONRAD.
PROTECTIVE MEANS FOR ELECTRICAL SYSTEMS.
APPLICATION FILED OCT. 31, 1910.
1,155,133.
Patented Sept. 28, 1915.
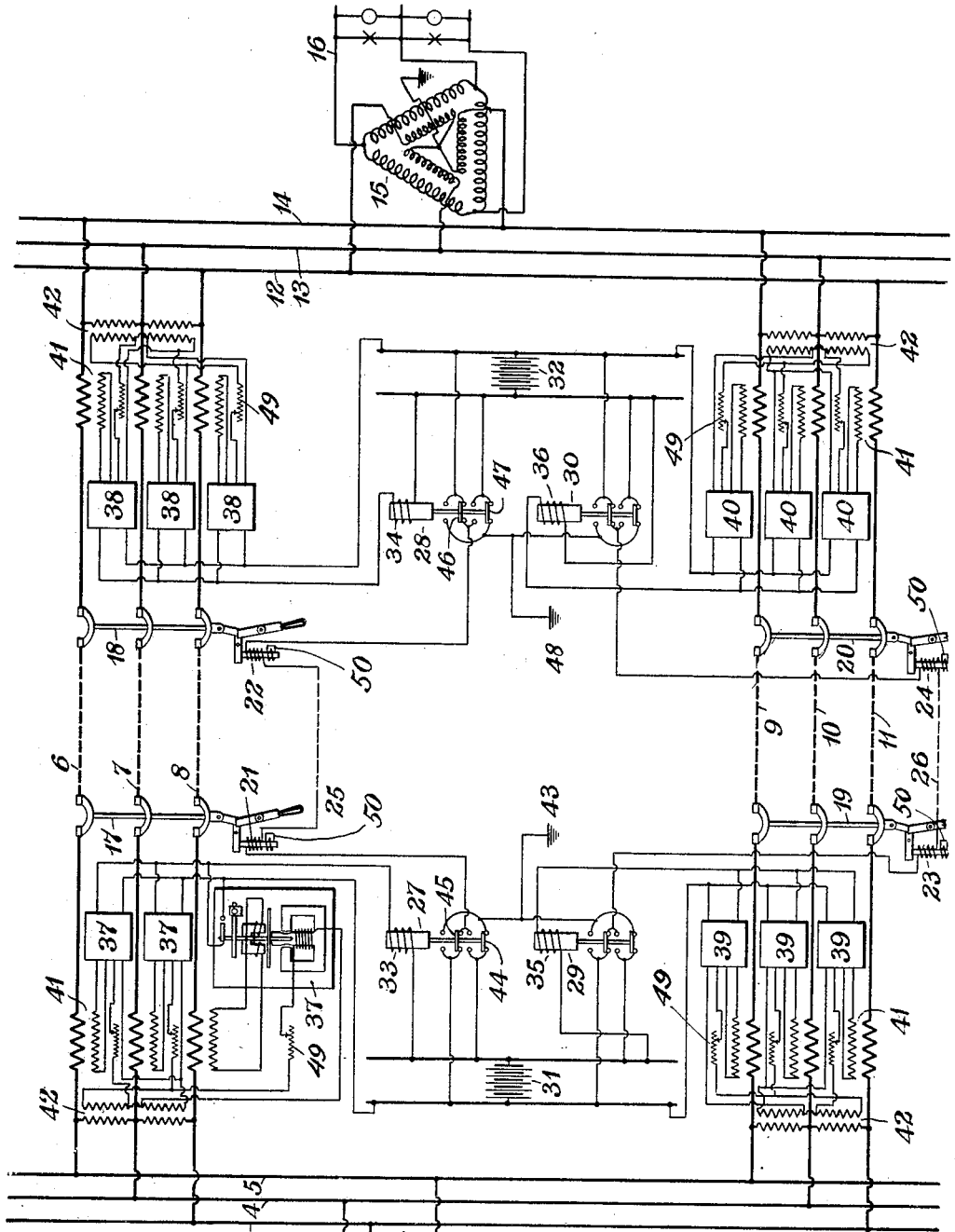
WITNESSES:
C. L. Belcher
Otto S. Schairer
INVENTOR
Frank Conrad
BY
Wesley G. Carr
ATTORNEY

UNITED STATES PATENT OFFICE.

FRANK CONRAD, OF SWISSVALE, PENNSYLVANIA, ASSIGNOR TO WESTINGHOUSE ELECTRIC AND MANUFACTURING COMPANY, A CORPORATION OF PENNSYLVANIA.

PROTECTIVE MEANS FOR ELECTRICAL SYSTEMS.

1,155,133.  Specification of Letters Patent.  Patented Sept. 28, 1915.

Application filed October 31, 1910. Serial No. 589,897.

*To all whom it may concern:*

Be it known that I, FRANK CONRAD, a citizen of the United States, and a resident of Swissvale, in the county of Allegheny and State of Pennsylvania, have invented a new and useful Improvement in Protective Means for Electrical Systems, of which the following is a specification.

My invention relates to systems of electrical distribution and particularly to protective means for systems comprising two or more parallel transmission circuits or lines extending between main stations and sub-stations.

The object of my invention is to provide simple, inexpensive and reliable means for disconnecting an injured transmission circuit from a system, comprising two or more of such circuits, without disturbing the remaining circuits.

In the single figure of the accompanying drawing, which diagrammatically illustrates a system embodying my invention, a main station comprising a generator 1, a step-up transformer 2, and bus-bars 3, 4 and 5 is connected by means of two parallel transmission circuits 6—7—8 and 9—10—11, with a distant sub-station comprising bus-bars 12, 13 and 14, step-down transformer 15 and a distributing circuit 16. The invention, however, is adapted for use in connection with systems comprising any number of generating or sub-stations arranged in any other relation to each other than that shown, and also in connection with systems comprising any other number than two parallel transmission circuits or lines.

At the ends of the transmission circuits or lines, are circuit-breakers 17, 18, 19 and 20 having tripping coils 21, 22, 23 and 24, respectively, the coils 21 and 22 being connected by means of an auxiliary line or transmission conductor 25, and the coils 23 and 24 being similarly connected by means of a conductor 26. Associated with the several tripping coils of the circuit-breakers, are short-circuited coils 50, that serve to prevent the tripping coils from causing the circuit-breakers to open in case the said coils are supplied with alternating current which is induced in the conductors 25 and 26 by reason of their proximity to the transmission circuit conductors. The tripping coils are also respectively connected to stationary contact terminals of electromagnetically operated switches 27, 28, 29 and 30 that are provided for the purpose of reversing the connections of batteries 31 and 32 in the circuits comprising the circuit-breaker tripping coils and auxiliary conductors 25 and 26. The switches 27, 28, 29 and 30 are provided with operating or controlling magnet coils 33, 34, 35 and 36, respectively, the circuits of which are adapted to be closed by means of reverse current relay devices 37, 38, 39 and 40, that are associated, respectively, with the ends of the transmission circuits, there being one relay for each phase of each of the circuits. The relay devices 37, 38, 39 and 40 are constructed like a wattmeter, such, for instance, as that set forth in Patent No. 853,218, to Wm. Bradshaw, and they are supplied with current from series transformers 41 and shunt transformers 42, the series coils of each wattmeter being associated with a differently phased transmission circuit conductor from those between which the corresponding shunt coils are connected through the shunt transformers 42. The circuits of the shunt windings of the relays are also made as nearly non-inductive as possible, as by the use of resistances 49, which, combined with the above-described connections, cause the currents in the shunt and series coils of the relays to be substantially 90° different in phase. Thus, working voltages upon the shunt windings are more reliably insured than would be the case if the windings of each relay were associated with the same phase, as an increase of current in one phase is ordinarily accompanied by a rise of voltage across the other phases.

During the normal operation of the system, a circuit extends from the ground at 43, through switch member 44 of the reversing switch 27, battery 31, switch member 45 of the reversing switch, tripping coil 21 of the circuit-breaker 17, conductor 25, tripping coil 22 of the circuit-breaker 18, switch member 46 of the reversing switch 28 at the sub-station end of the system, battery 32 and switch member 47 of the reversing switch 28 to the ground at 48. The batteries 31 and 32 at the two ends of the system then oppose each other and the tripping coils 21 and 22 are not energized. The circuit through the tripping coils 23 and 24 of the circuit-breakers 19 and 20 is similar to that just described for the tripping coils 21 and 22.

If a short circuit occurs upon the transmission circuit 6—7—8, a current will be supplied, in the normal direction, through the series transformers 41 and the circuit-breaker 17 to the circuit 6—7—8, toward the short circuit. At the same time, current will traverse the transmission circuit 9—10—11 from the main station to the sub-station, and from thence through the circuit-breaker 18 in the reverse of normal direction toward the short circuit. On account of the reversal of flow of current, one or more of the relay devices 38 at the sub-station end of the transmission circuit will operate to close the circuit of the magnet winding 34 of the reversing switch 28. The batteries 31 and 32 at the two ends of the system, therefore, no longer oppose but, on the contrary, they supplement each other, the circuit being then from the main station as far as through the tripping coil 22, the same as before described, and from thence proceeding through switch member 47, battery 32 and switch member 46 to the ground at 48. The tripping coils 21 and 22 will, therefore, be energized and the circuit-breakers 17 and 18 will open simultaneously.

The operation of the system would be similar if short circuit or other abnormal conditions should occur in the transmission circuit 9—10—11.

I claim as my invention:

1. A system of distribution comprising parallel transmission circuits, circuit-breakers therein at each end thereof, tripping coils for the circuit-breakers, conductors connecting the tripping coils of the circuit-breakers that are associated with the same circuits, the said conductors being grounded at their ends, sources of current in the circuits of said conductors at each end thereof, reversing switches also in the circuits of said conductors at each end thereof, and normally occupying positions to cause opposition of the sources of current, and relays associated with each transmission circuit at each end thereof and governing the reversing switches to cause the said sources to supplement each other upon the occurrence of abnormal conditions in the transmission circuits.

2. A system of distribution comprising parallel transmission circuits, circuit-breakers therein at each end thereof, tripping coils for the circuit-breakers, conductors connecting the tripping coils of the circuit-breakers that are associated with the same circuits, sources of current in the circuits of said conductors at each end thereof, reversing switches also in the circuits of said conductors at each end thereof and normally occupying positions to cause opposition of the sources of current, and relays associated with each transmission circuit at each end thereof and governing the reversing switches to cause the said sources to supplement each other upon the occurrence of abnormal conditions in the transmission circuits.

3. A system of distribution comprising an alternating current transmission circuit, circuit-breakers therein at each end thereof, tripping magnets for the circuit-breakers having energizing coils and short-circuited coils, and a conductor connecting the energizing coils of the tripping magnets.

4. The combination with an electrical circuit, and a circuit-breaker therein, of an auxiliary conductor extending parallel to said circuit, and a tripping magnet for the circuit-breaker having an energizing coil in circuit with said conductor and a short-circuited coil.

In testimony whereof, I have hereunto subscribed my name this 29th day of Oct. 1910.

FRANK CONRAD.

Witnesses:
OLIVER S. JENNINGS,
B. B. HINES.